O. COOLEY.
Shaft-Hanger.

No. 198,354. Patented Dec. 18, 1877.

Witnesses.
J. Bonsall Taylor
Horace Binney 3rd

Inventor.
Orville Cooley
by his Atty
Guy Hunting

UNITED STATES PATENT OFFICE.

ORVILLE COOLEY, OF BROCKPORT, NEW YORK.

IMPROVEMENT IN SHAFT-HANGERS.

Specification forming part of Letters Patent No. 198,354, dated December 18, 1877; application filed November 26, 1873.

*To all whom it may concern:*

Be it known that I, ORVILLE COOLEY, of Brockport, Monroe county, in the State of New York, have invented a new and useful Improvement in Hangers and Bearings for Shafting; and I do hereby declare the following to be a full, clear, and precise description thereof, which will enable others skilled in the art to which it appertains, or to which it is most closely connected, to make and use the same, reference being had to the accompanying drawings, which form a part of this specification, and in which—

Figure 1:
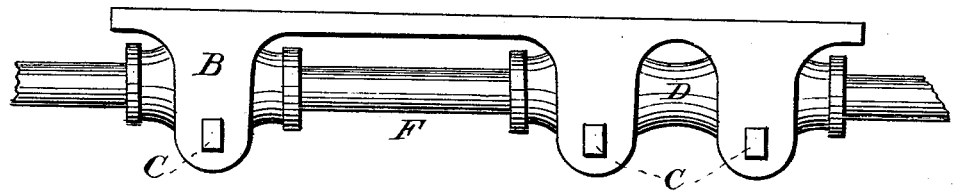
Figure 2:
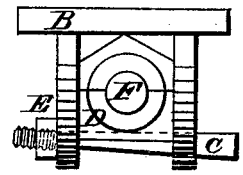
Figure 3:
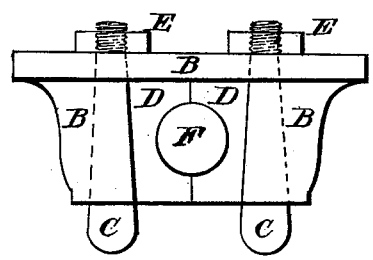
Figure 4:
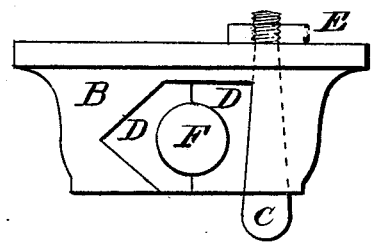
Figure 5:
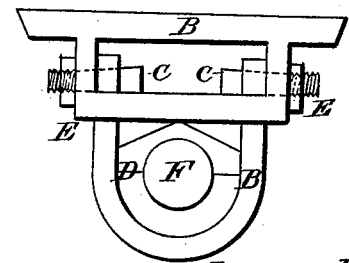

Figure 1 is a side elevation of the most common form of my device, showing hanger, bearing, and shaft in position. Fig. 2 is an end view of the same. Figs. 3, 4, and 5 are other and somewhat different forms of my invention, to be hereinafter more fully described.

Similar letters of reference indicate corresponding parts in all the figures.

My invention belongs to that class which has for its object the production of a convenient and effective hanger and bearing for shafting, to which it may apply.

The difficulties at present existing in bearings for shafting are the great trouble attending their removal in case of disarrangement and their extreme liability to get out of line. The bearings are usually permanently attached to their hangers, and, to detach the shaft or a pulley upon it, very frequently the entire hanger must be removed from its bed.

Now, I claim for my invention simplicity, cheapness, durability, adaptability for removal of the bearings from their hangers, and ease of adjustment of the line of axis of the bearings.

The principle of my invention is the application of a wedge-shaped bolt for the purpose of holding a bearing accommodated for into a hanger or suitable frame.

B in Fig. 1 represents an elongated series of connected hangers, fashioned as desired; B in Fig. 2, their end view. F is the shaft. D is the bearing—a split bearing of peculiar conformation, as shown in both figures. This bearing is nicely fitted into the hanger. The upper half is wedge-shaped on its upper surface, and takes into a corresponding recess in the hanger. C represents the bolts, which are in reality elongated wedge-shaped pieces of metal, provided with a screw-thread and nut upon the smaller end. These bolts pass through slots in the lower parts of the sides of the hangers, press up upon and hold in place the bearings; then, as the nut is screwed down upon the projecting end of the bolt, the traction thereby exerted draws the bolt farther through, and the bolt, by its very conformation, wedges the bearings together and up in place within the hanger.

The great convenience of this my method can readily be understood, how, by one simple bolt, the bearing is held in the hanger and the bearing itself tightened or loosened, as desired. Then, too, if at any point the shafting is out of line, by simply screwing or unscrewing the bolt, as the requirements of the case demand, the line of axis of the bearing is altered and adjusted.

There are many methods of embodying this principle, some of which I have illustrated by drawings. Thus, Fig. 3 shows another form of my invention, in which the wedge-bolts are set vertically and the bearing split vertically, the compression in this case acting laterally and doubly, there being two vertical bolts. The nuts in this case are at the top of the hanger. Fig. 4 is a similar arrangement, having, however, only one bolt. Fig. 5 shows a somewhat more complex arrangement, in which the hanger is made of two parts—an upper rectangular frame and a semicircular movable lower frame—held to the upper portion of the frame by wedge-bolts, as shown in the drawing more fully. The principle is identical, the form alone modified.

I do not limit myself to arrangements for shafting alone, but contemplate applying this principle to bearings of axles, of vibrating and reciprocating, as well as of rotating rods, piston and valve rods.

I am aware that it is not new to make a crank-connection or a pitman-connection by means of a divided box and a wedge-shaped key. This, however, does not constitute any part of my invention, for the reason that the sole object of such construction is to tighten the boxing upon the shaft or wrist-pin to prevent rattling and lost motion; whereas my invention is designed to apply to hangers and bearings for shafting, axles, and revolving and vibrating rods, one of the essential elements being the hanger, which is not found and is not needed in pitman and crank connections.

I therefore claim as my invention—

The combination, with the hanger B, of the split adjustable blocks D D within the hanger, and embracing the rod F, and the movable wedge-shaped key or keys C, provided with screw-threads and nuts thereon bearing against the hanger, substantially as described.

ORVILLE COOLEY.

Witnesses:
O. G. SCHONTON,
A. F. BENEDICT.